US011358527B2

(12) United States Patent
Wilson et al.

(10) Patent No.: US 11,358,527 B2
(45) Date of Patent: Jun. 14, 2022

(54) POWERED TELESCOPING DRIVE SYSTEM

(71) Applicant: MOTHERSON INNOVATIONS COMPANY LIMITED, London (GB)

(72) Inventors: Douglas James Wilson, Troy, MI (US); Kenneth Gira, Troy, MI (US); Chad Meyea, Troy, MI (US)

(73) Assignee: Motherson Innovations Company Limited, London (GB)

( * ) Notice: Subject to any disclaimer, the term of this patent is extended or adjusted under 35 U.S.C. 154(b) by 518 days.

(21) Appl. No.: 16/539,598

(22) Filed: Aug. 13, 2019

(65) Prior Publication Data
US 2021/0046873 A1    Feb. 18, 2021

(51) Int. Cl.
*B60R 1/06* (2006.01)
*F16H 35/00* (2006.01)
*F16H 1/22* (2006.01)
*F16H 19/04* (2006.01)

(52) U.S. Cl.
CPC ............. *B60R 1/0612* (2013.01); *F16H 1/22* (2013.01); *F16H 35/00* (2013.01); *F16H 19/04* (2013.01)

(58) Field of Classification Search
CPC ......... B60R 1/0612; B60R 1/078; F16H 1/22; F16H 35/00; F16H 19/04; F16H 1/06
See application file for complete search history.

(56) References Cited

U.S. PATENT DOCUMENTS 9,470,273 B2\* 10/2016 Lang .................... F16D 7/10
2009/0080096 A1\* 3/2009 Fimeri ................ B60R 1/074
359/841

\* cited by examiner

*Primary Examiner* — Jade R Chwasz
(74) *Attorney, Agent, or Firm* — Jones Day

(57) ABSTRACT

A power telescoping external vehicle rearview assembly comprising a drive gear assembly for telescopically moving a rearview head between a retracted and an extended position is disclosed. An embodiment of the rearview assembly comprises a bracket mountable to a vehicle, a rearview head telescopically mounted to the bracket via a plurality of arm assemblies, a rearview element mounted to the rearview head, an electric motor mounted to the rearview head, and a gear assembly connected between the motor and the plurality of arm assemblies. An embodiment of the gear assembly comprises pinion drive gear assemblies with rolling clutches for selectively disengaging the motor from the arm assemblies, a fixed clutch assembly for transferring power from the motor to the pinion drive gear assemblies, and a drive shaft connecting the fixed clutch assembly to the pinion drive gear assemblies.

13 Claims, 19 Drawing Sheets

POWERED TELESCOPING DRIVE SYSTEM

TECHNICAL FIELD

The present disclosure relates generally to external vehicle rearview assembly and more specifically to improvements to external rearview assemblies having powered telescoping extension between laterally-retracted and laterally-extended positions.

BACKGROUND

Telescoping "trailer tow" type mirrors are external vehicle mirrors designed to extend away from, and retract towards, the side of the vehicle. Currently, telescoping mirrors can be manually adjustable, requiring the vehicle operator to position the mirror head by hand, or both automatically and manually adjustable. In systems where the telescoping feature is powered electrically, it must include a "back-up" means for manually overriding the power drive system in the event the electrical system fails.

Existing powered telescoping mirrors typically employ a slip clutch assembly as this "back-up" system. Slip clutch assemblies usually contain a plurality of clutch discs that are held in a compressed state by some sort of spring mechanism. Slip clutches help to prevent back-driving of the electrical motor when the mirror head is manually extended or retracted. But they also substantially increase the amount of slide force required during such manual operation, which may be unacceptable to the vehicle operator.

Additionally, existing powered telescoping mirrors often emit loud noises when in use due to the configuration of the motor and gears in the power drive system. These noises can be distracting and bothersome to vehicle operators. As such, improvements are needed to reduce both the manual override slide force and the degree of noise.

SUMMARY

In one aspect, a power telescoping external vehicle rearview assembly includes improved drive gear assemblies for telescopically moving a rearview head between a retracted and an extended position is disclosed. An embodiment of the rearview assembly includes a bracket mountable to a vehicle, a rearview head telescopically mounted to the bracket via a plurality of arm assemblies, a rearview element mounted to the rearview head, an electric motor mounted to the rearview head, and a gear assembly connected between the motor and the plurality of arm assemblies. An embodiment of the gear assembly includes pinion drive gear assemblies with rolling clutches for selectively disengaging the motor from the arm assemblies, a fixed clutch assembly for transferring power from the motor to the pinion drive gear assemblies, and a drive shaft connecting the fixed clutch assembly to the pinion drive gear assemblies. An alternative embodiment of the gear assembly includes pinion gears coupled to the plurality of arm assemblies, a locking clutch assembly for transferring power from the motor to the pinion gears and for selectively disengaging the motor from the arm assemblies, and a drive shaft connecting the locking clutch assembly to the pinion gears.

In embodiments, the power drive system for telescopically moving the external vehicle rearview element includes an electric motor, a pinion gear connected to an armature extending from the electric motor, a turnstile gear interlocked with the pinion gear, a worm gear rotationally attached to the turnstile gear, and a drive gear assembly connected to the worm gear, wherein the rotation of the drive gear assembly causes the external vehicle rearview element to move between a retracted and an extended position.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein.

DETAILED DESCRIPTION

Figure 1A:
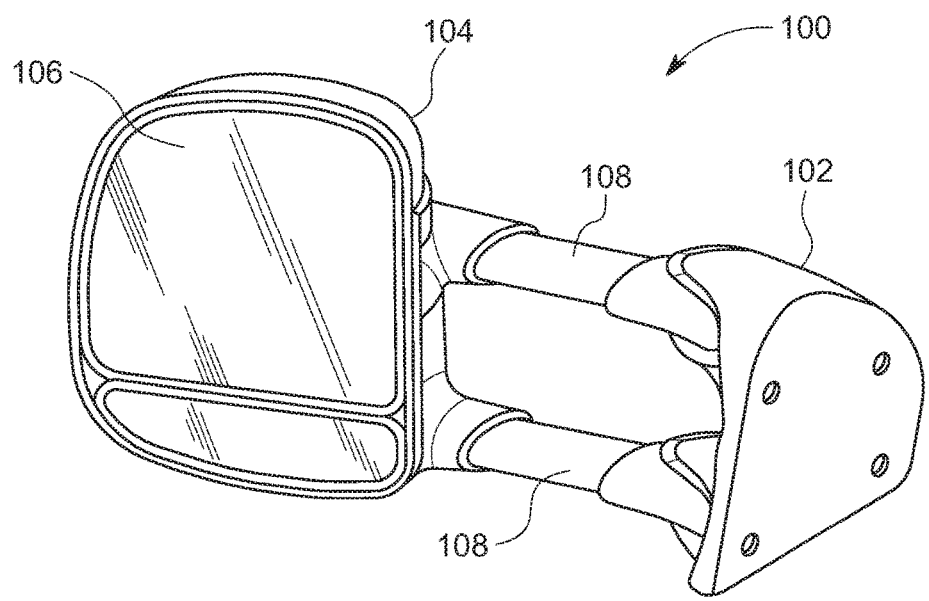
FIGS. 1A and 1B depict an example external vehicle rearview assembly in a laterally-retracted and a laterally-extended position, respectively.

It is to be understood that the disclosure is not limited in its application to the details of construction and to the arrangements of the components set forth in the following description or illustrated in the drawings. The figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding. Those skilled in the art will also appreciate that the development of an actual commercial embodiment incorporating aspects of the present disclosure may require numerous implementation-specific decisions to achieve the developer's ultimate goal for the commercial embodiment.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the figures and are not intended to limit the scope of the present disclosure. Further, it should be understood that any one of the features may be used separately or in combination with other features. Other systems, methods, features, and advantages will be or become apparent to those skilled in the art upon examination of the figures and the description. It is intended that all such additional systems, methods, features, and advantages be included within this description, and be within the scope of the present disclosure.

Figure 1B:
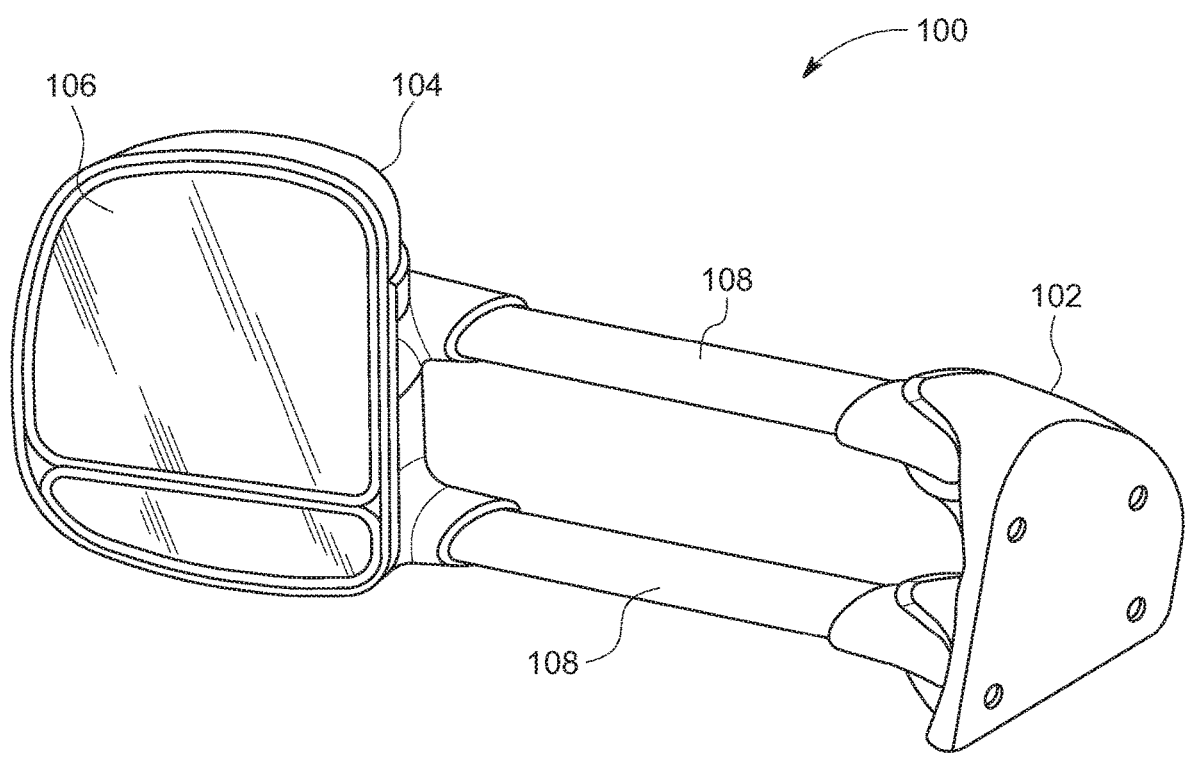

FIGS. 1A and 1B depict perspective views of a "trailer tow" type vehicle external rearview assembly 100. The rearview assembly 100 includes a mounting bracket 102, a pair of substantially parallel arm assemblies 108 extending from the bracket 102, and a rearview head 104 with rearview element 106. The rearview head is moveable with respect to the arm assemblies 108 from a retracted position (FIG. 1A) to an extended position (FIG. 2B). In an extended position, the rearview head is further displaced from the vehicle's side, providing the vehicle driver with a wider field of view behind the vehicle. Rearview elements 106 of the kind shown in FIGS. 1A and 1B can either be manually adjustable or both manually and automatically adjustable away from or towards the mounting bracket 102 attached to the side of the vehicle.

For powered telescoping trailer tow rearview elements, the electric drive mechanism automatically adjusting the rearview element must exert enough drive force to extend and retract the rearview head in all environmental conditions. But it also must have a "back-up" means for manually overriding the power drive system in the event the electrical system fails. Existing powered telescoping rearview elements typically employ a slip clutch assembly as this "back-up" system. Slip clutches help to prevent back-driving of the electrical motor when the rearview head is manually extended or retracted, thereby protecting the drive system from damage. But slip clutches also substantially increase the amount of slide force required during such manual operation, which may be unacceptable to the vehicle operator.

Additionally, existing powered telescoping rearview elements often emit a noise due to the configuration of the electric motor and inner gears. These noises can be loud or distracting to the vehicle operator when in use. As such, improvements are needed to reduce both the manual override slide force and the degree of noise in current drive systems.

FIGS. 2A-5 depict existing embodiments of a powered telescoping rearview element, including a slip clutch as the "back-up" means for manually overriding the power drive system. FIGS. 6A-8D depict embodiments of the disclosed invention, substituting out the slip clutch assembly for improved drive system clutches that maintain full power drive force while minimizing the manual override slide force. FIGS. 9A-12B depict embodiments of the disclosed invention including an improved gear configuration within the power drive system to eliminate the loud noises common in existing systems.

Powered Telescoping Rearview Elements With Slip Clutch Assembly.

Figure 2A:
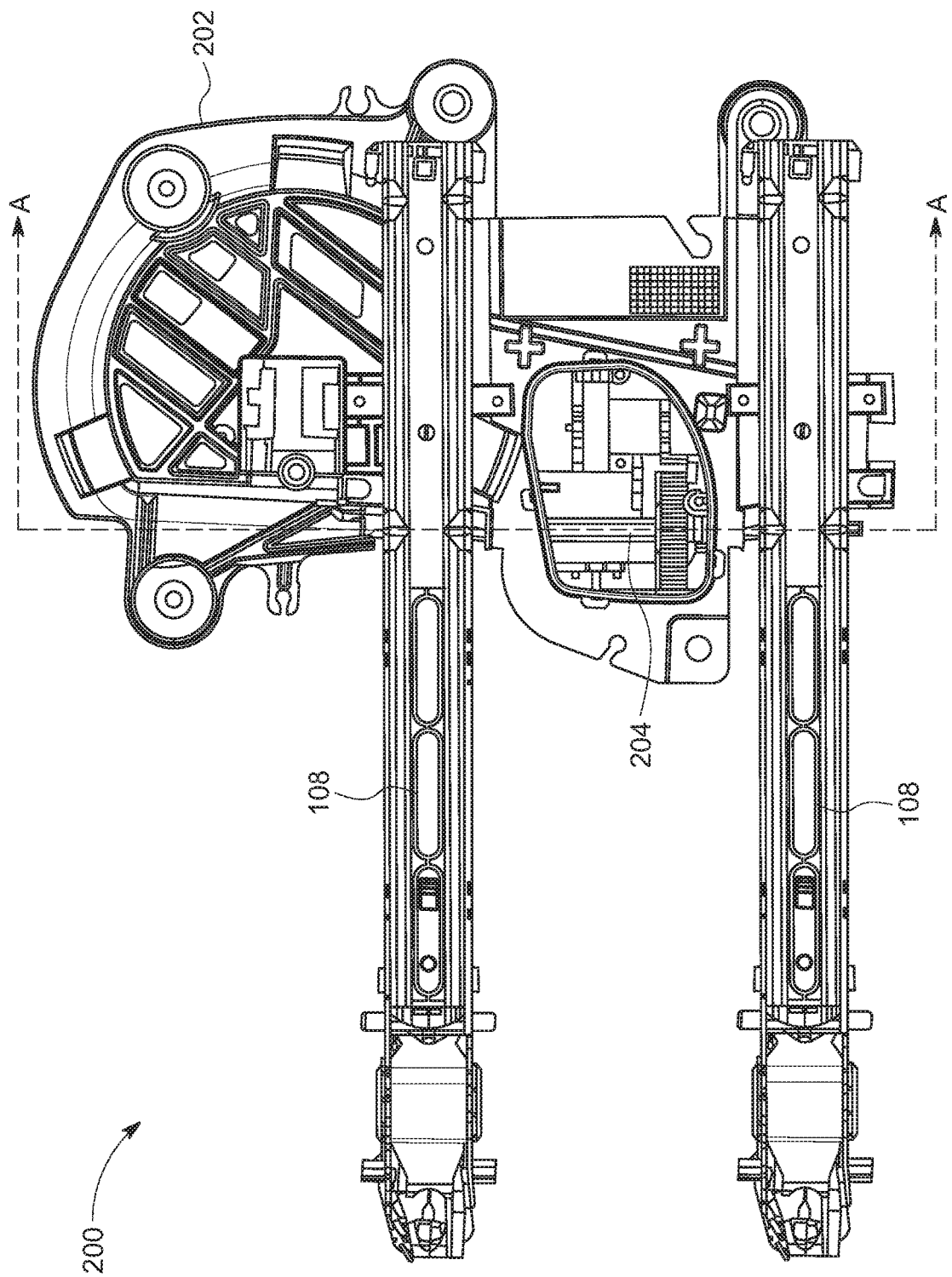
FIG. 2A depicts an embodiment of a powered telescoping rearview assembly.
Figure 2B:
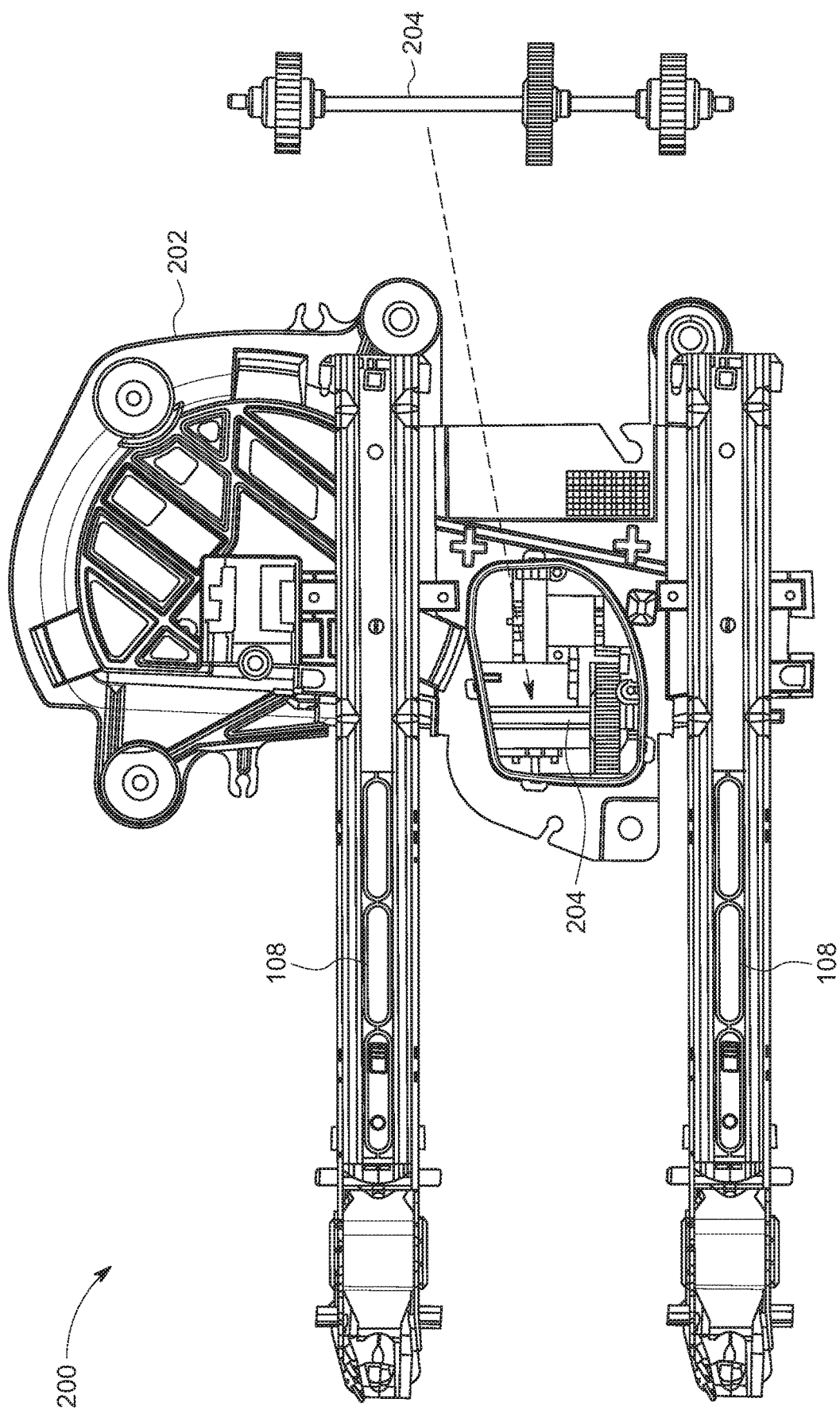
FIG. 2B depicts the embodiment of FIG. 2A with the drive gear assembly removed for viewing.

Referring to FIG. 2A, an embodiment of an existing powered telescoping rearview assembly is pictured. Rearview assembly 200 comprises case frame 202 and drive gear assembly 204. The case frame 202 attaches at attachment points to a rearview head, and drive gear assembly 204 automatically extends and retracts the rearview head via arm assemblies 108 towards and away from the side of the vehicle. Because the drive gear assembly 204 is partially obscured from view by case frame 202 in FIG. 2A, FIG. 2B depicts the embodiment of FIG. 2A with the drive gear assembly 204 removed for viewing.

Figure 3:
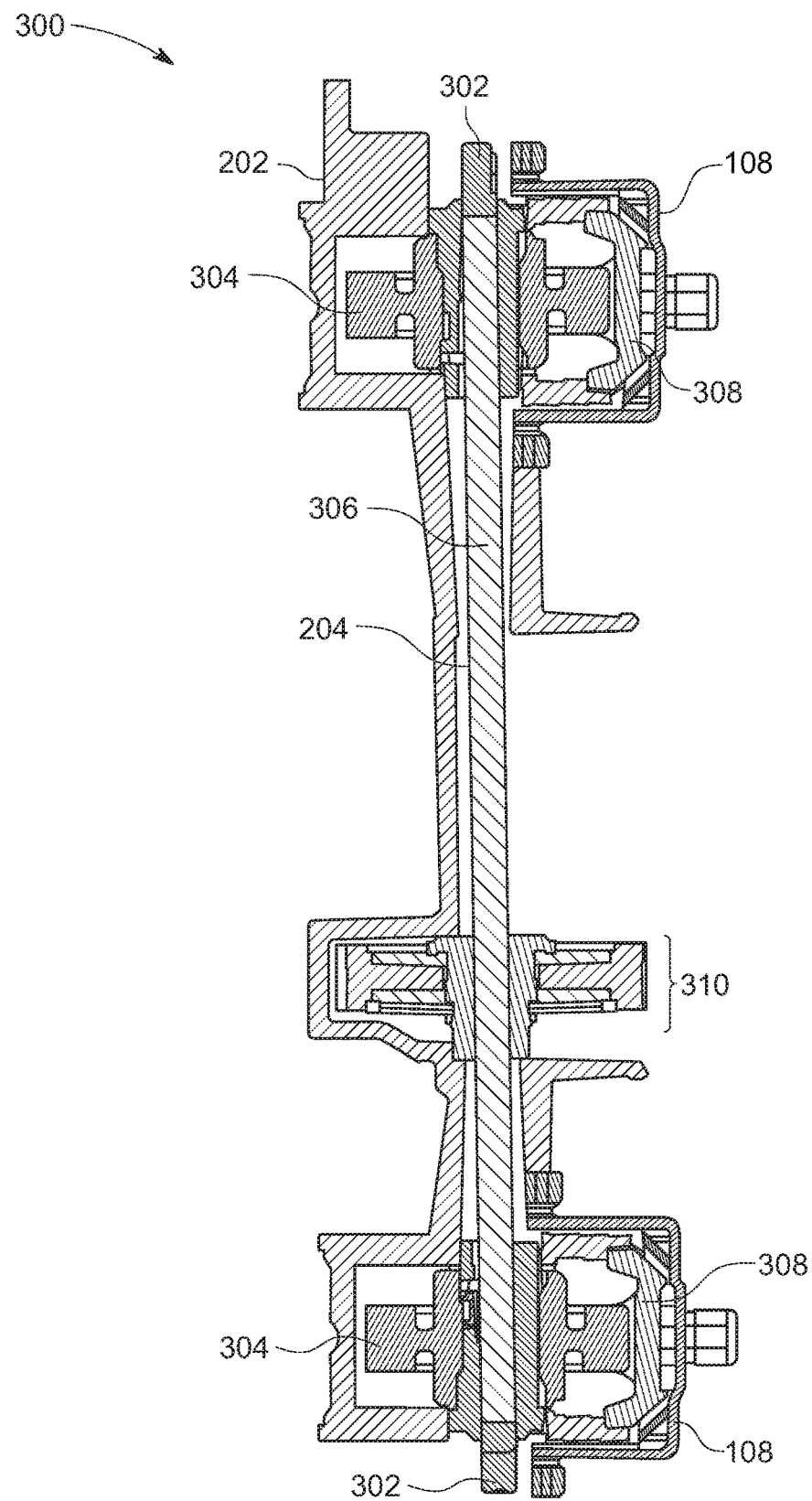
FIG. 3 depicts a sectional view of a portion of the powered telescoping rearview assembly.

FIG. 3 depicts a vertical sectional view of a portion of the powered telescoping rearview assembly along section A-A as seen in FIG. 2A. The view represents the portion of the rearview assembly 300 including drive gear assembly 204. The depicted embodiment of the drive gear assembly 204 includes two hub retainers 302, two pinion gears 304, a drive shaft 306, and a slip clutch assembly 310. Drive shaft 306 extends through pinion gears 304 and slip clutch assembly 310. The drive shaft 306 transmits motor power through the pinion gears 304 provided at opposite ends of drive shaft 306. The rotation of the pinion gears 304, on gear rack 308, drive the arm assemblies 108 inwards and outwards telescopically, moving the rearview head towards and away from the vehicle. The means for rotating the gears 304 and slip clutch assembly 310 are further described in reference to FIGS. 4 and 5 below.

Figure 4:
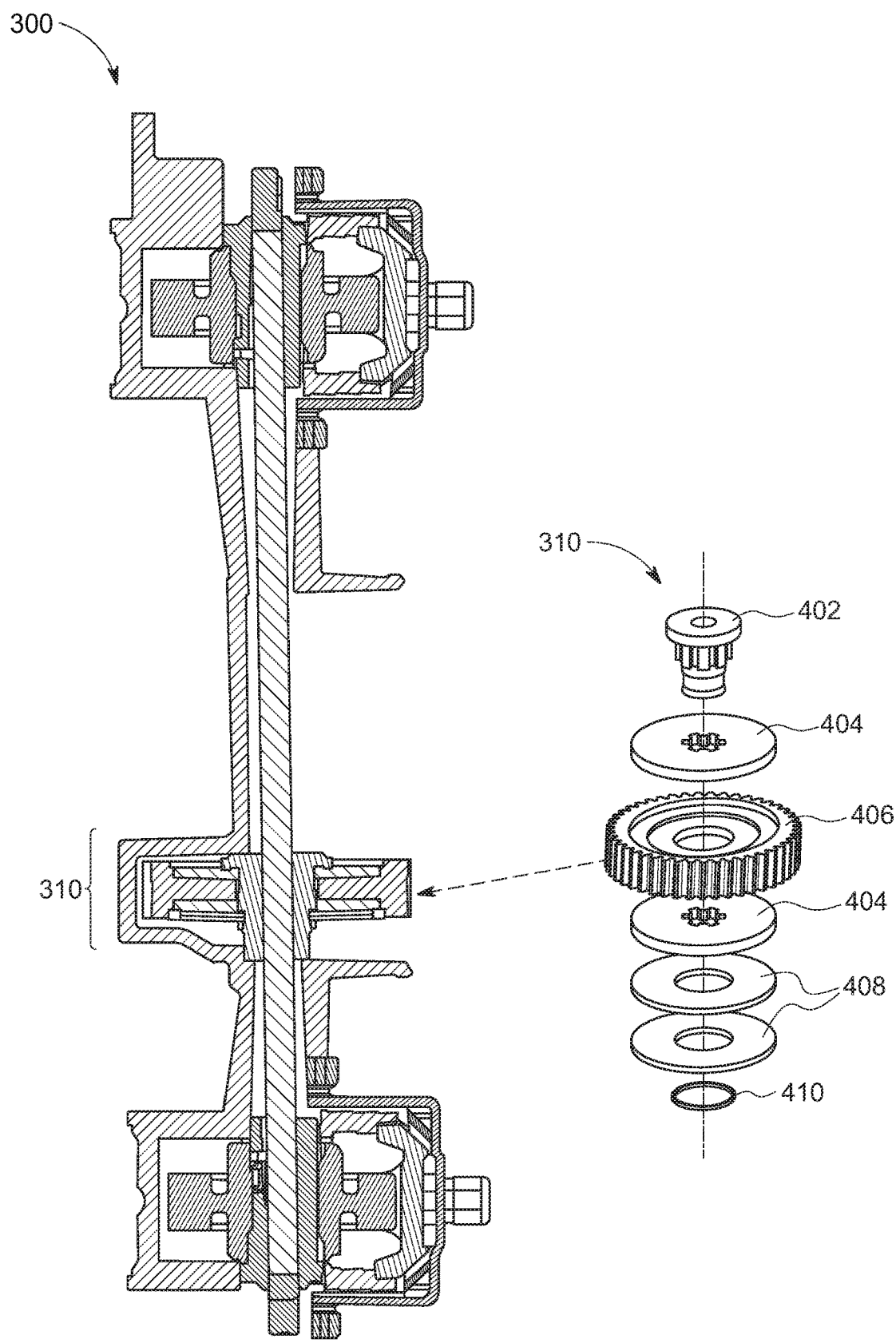
FIG. 4 depicts an exploded view of the slip clutch assembly of the FIG. 3 embodiment.

FIG. 4 is an exploded view of an embodiment of the slip clutch assembly 310. The pictured embodiment depicts a typical slip clutch assembly 310, including a clutch hub 402, two clutch disks 404, clutch gear 406, two wave washers 408, and retainer clip 410. As seen in the FIG. 5 exploded view of an embodiment of a powered telescoping rearview assembly 500, slip clutch assembly 310 is positioned between the two pinion gears 304 along the drive shaft 306. The depicted embodiment further includes primary drive gear 502, motor with worm gear 504, secondary drive gear 506, cap 508, and screws 510. In operation, gears 502, 506 and motor with worm gear 504 provide a driving force to the drive shaft 306, which in turn rotates the pinion gears 304 to telescopically extend and retract the attached arm assemblies. In embodiments, the configuration of the inner gear assemblies and motor are that of the FIG. 4 depiction. In other embodiments, the configuration of the gear assemblies and motor are that of the improved telescoping drive system as described and depicted in reference to FIGS. 9A-12B below.

As discussed, most current power telescoping mechanisms use a slip clutch assembly to provide the system with a back-up means for manually "overriding" the power drive system in the event the electrical system fails. Slip clutches, like slip clutch assembly 310, usually contain a plurality of clutch discs that are held in a compressed state by a type of spring mechanism. These slip clutches will, by their very nature, be a source of additional slide resistance when manually extending and retracting the rearview head. This is because the design slip point must be high enough to overcome the resistance of the combined manual extend/retract force of the telescoping arm assemblies. In other words, the slip clutch alone will substantially increase the manual extend/retract force of the assembly since the clutches' slip point must be equal to or greater than the arm assemblies' slide resistance.

In telescoping "trailer tow" type rearview elements, the interface between the arm slide features and the arm assemblies must be fundamentally rigid for optimum on-vehicle rearview element vibration performance. As such, the features must be tight enough to achieve an acceptable rearview element vibration performance without making the operational slide forces so high that manually extending or retracting the rearview head is outside the acceptable ergonomic range of the vehicle operator.

The increased slide force from the slip clutch in combination with the slide resistance inherent to the rigid interfaces of the arm assemblies may be unacceptable to the vehicle operator. One way to counter this unfavorable condition is to reduce the slide force contributed by the arm interfaces; essentially loosening the interfaces to drop the combined overall slide forces to an acceptable level. But as discussed, for optimum on-vehicle rearview element vibration performance, the interface between the arm slide features and the arm assemblies must be fundamentally rigid. Loosening the arm interfaces may reduce the slide forces, but it would also lead to a diminished on-vehicle rearview element vibration performance in comparison to a manual telescoping rearview element. Therefore, there is a need to develop a drive system for a powered telescoping rearview element that can retain the close dimensional arm interfaces of a manual telescoping rearview element without the drive system and/or clutch adding to the overall manual override slide forces.

Powered Telescoping Rearview Elements With Improved Clutch Assemblies.

An embodiment of the disclosed invention serves this need by replacing the slip clutch common in most existing powered telescoping rearview elements (e.g., slip clutch assembly 310 in FIGS. 3-5) with a fixed clutch, and employing "rolling" clutches inside each pinion gear on the telescoping arms. FIG. 6A is a sectional view of an embodiment of an improved power telescoping rearview assembly 600 including pinion gears with roller clutches 602. The section of the assembly pictured depicts an improvement to the A-A section of FIG. 2A.

Figure 5:
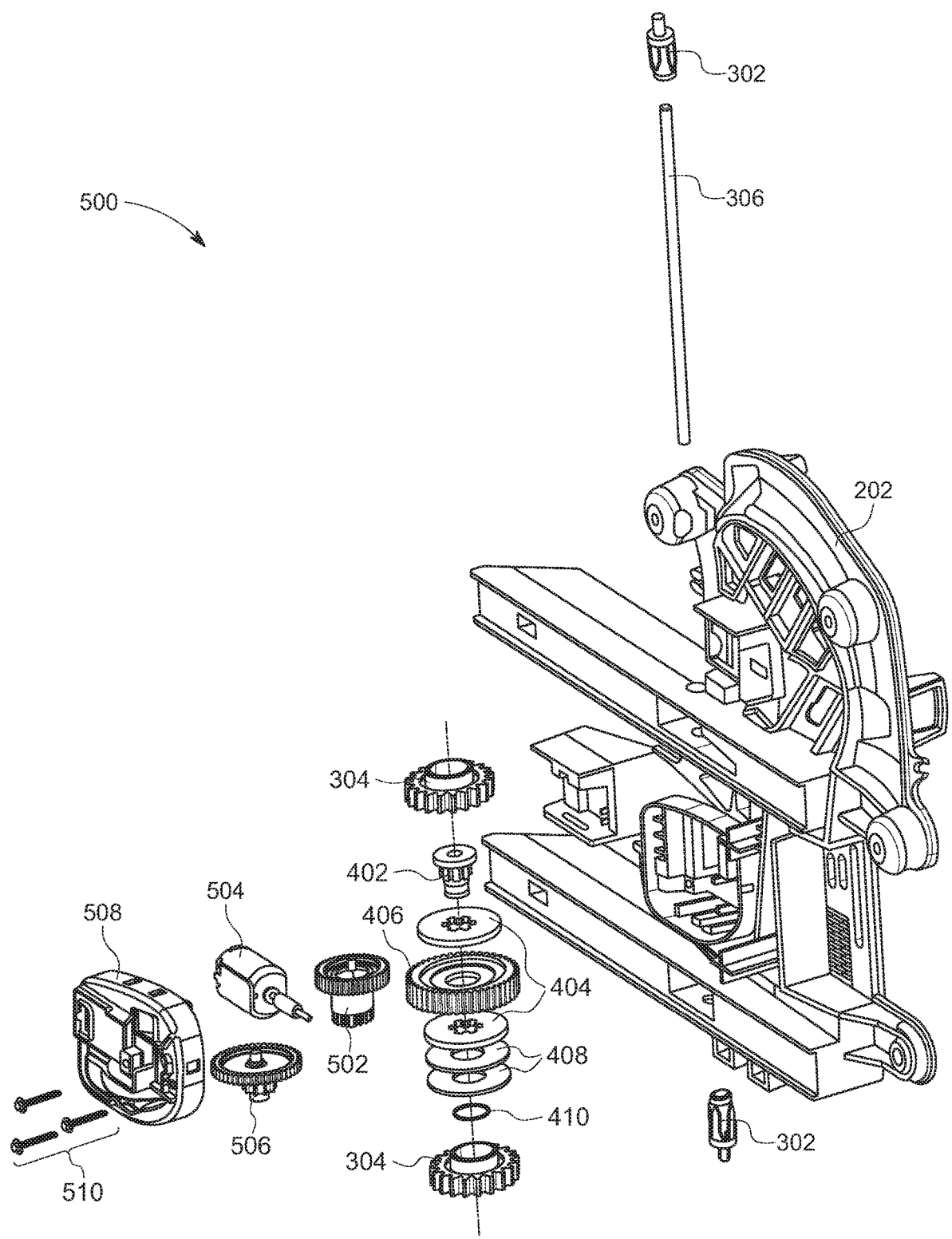
FIG. 5 depicts an exploded view of the FIG. 2A powered telescoping rearview assembly.
Figure 6A:
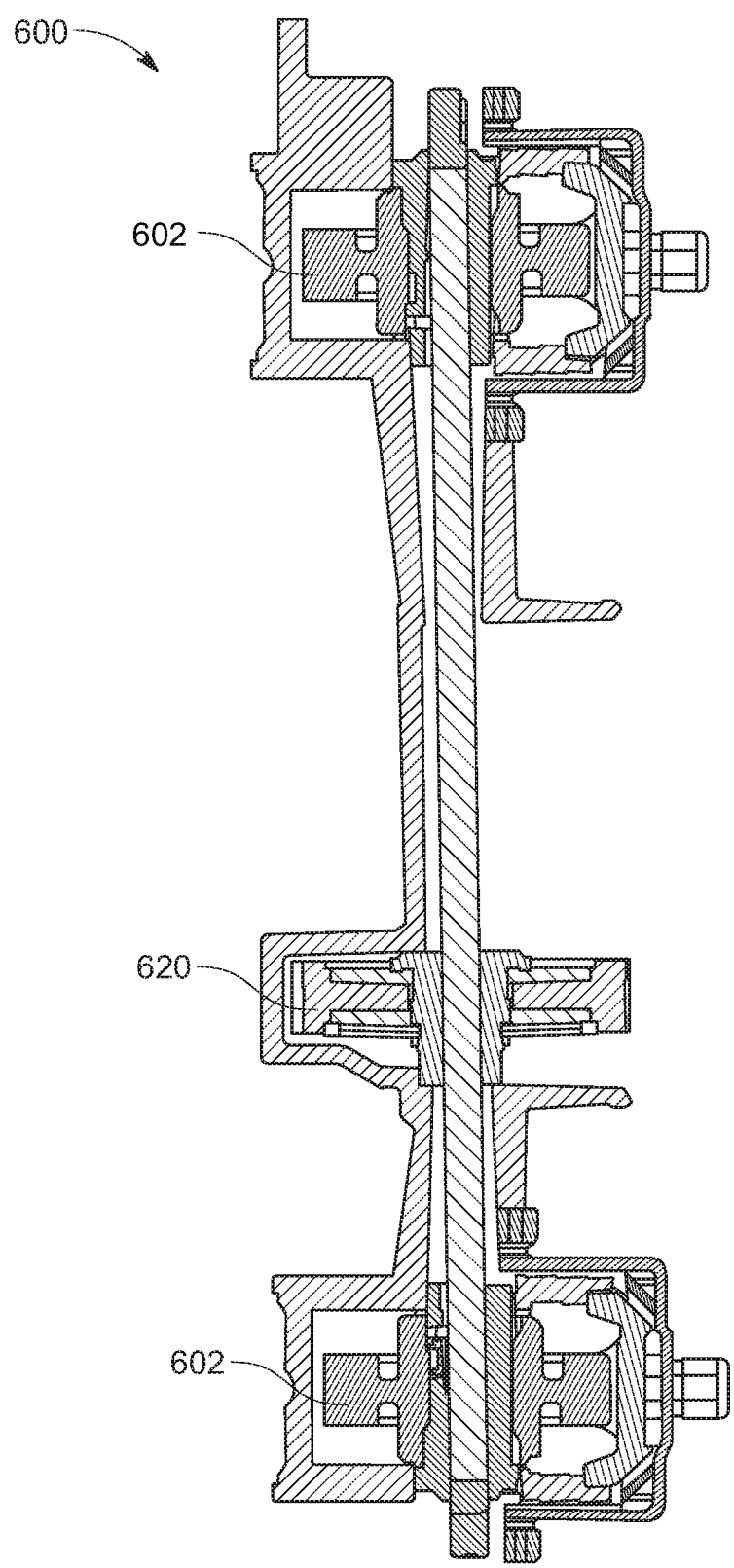
FIG. 6A depicts a sectional view of an embodiment of an improved power telescoping rearview assembly including pinion gears with rolling clutches.

As seen in FIG. 6A, fixed clutch 620 is in the place of the traditional slip clutch (e.g., slip clutch assembly 310 in FIGS. 3-5), and pinion gear assemblies 602 made up of pinion gears with rolling clutches are used instead of pinion gears (e.g., gears 304 in FIGS. 3-5). Rolling clutches essentially allow a condition where the full drive force of the electric motor can be applied to the power extend/retract cycle without adding to the override force during manual manipulation of the rearview head. During the manual override function, the pinion gears "free-wheel" in the assembly—the rolling clutches allow the free rotation of the pinion gears without back-driving the power telescoping drive system.

Figure 6B:
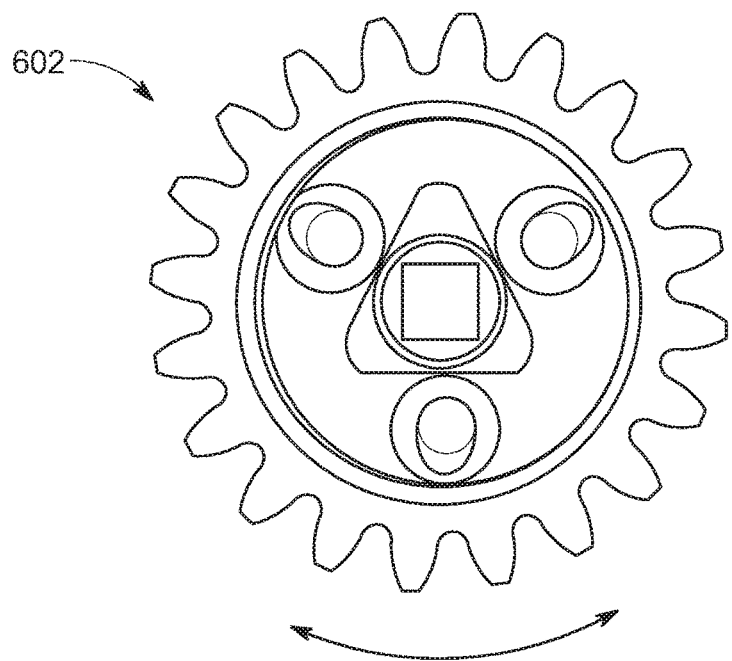
FIG. 6B depicts a front view of a pinion gear with a rolling clutch.
Figure 6C:
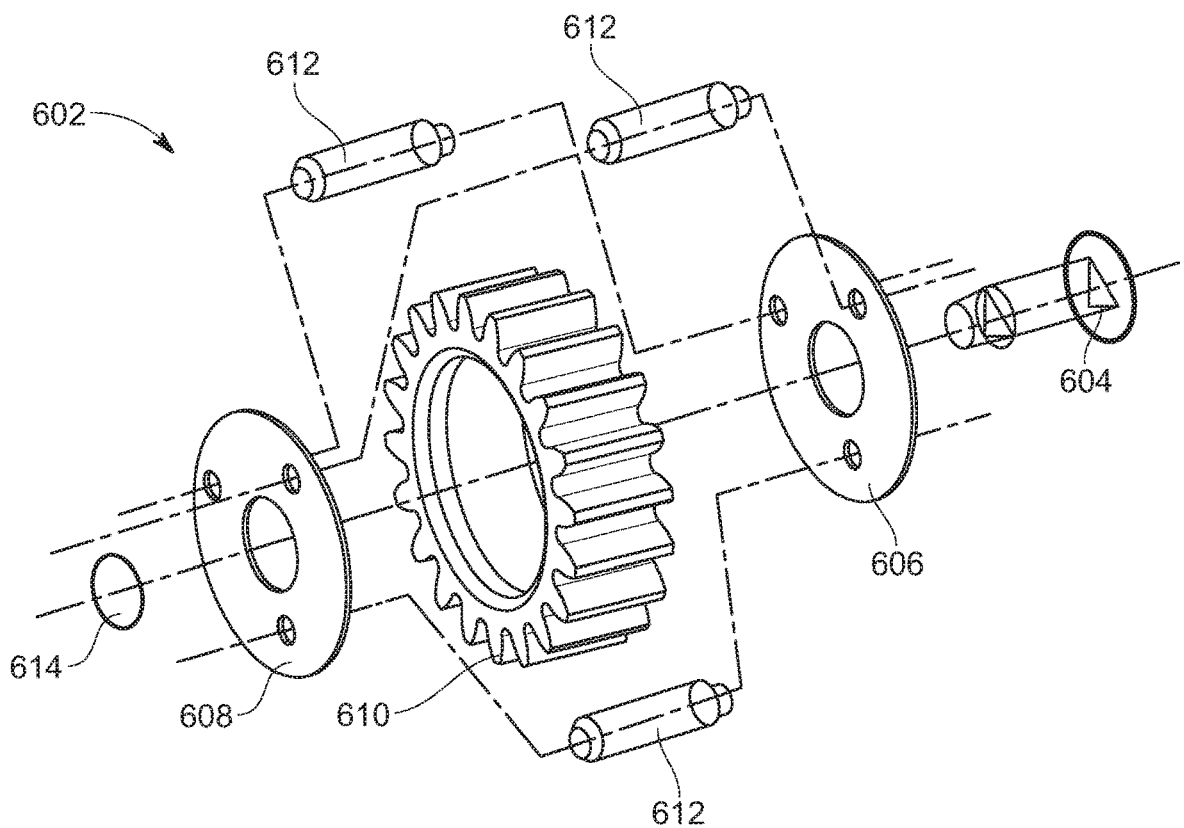
FIG. 6C depicts an exploded view of a pinion gear with a rolling clutch.

FIGS. 6B and 6C depict a front view and an exploded view, respectively, of an embodiment of a pinion gear with a rolling clutch. As seen in FIG. 6B, pinion gear assembly 602 includes an outer pinion gear with an inner rolling clutch. The pinion gear assembly 602 may rotate in the directions depicted by the arrow in FIG. 6B. The two pinion gear assemblies 602 in the system will rotate in one direction when the rearview head is being extended away from the vehicle, and the opposite direction when the rearview head is being retracted towards the vehicle.

Turning to FIG. 6C, an embodiment of pinion gear assembly 602 with a rolling clutch includes center hub 604, rear plate 606, pinion gear 610, front plate 608, and circlip 614. The rolling clutch includes a plurality of cam lobes and a plurality of roller bearings 612 located radially around the inner race of the pinion gear assembly 602. Roller bearings 612 contact the outer race of the gear and allow the manual rotation of the pinion gears 610 without back-driving the powered telescoping drive system. When a vehicle operator must extend/retract the rearview head manually, i.e., without using the electric motor of the powered drive system, the pinion gears 610 are in a "free-wheeling" state due to the roller bearings 612 in the rolling clutch. This allows the total slide force to be contained in the rearview arms just like a manual telescoping rearview element.

But, during the powered telescoping function, a drive shaft rotationally fixed to the center hub 604 is rotated via an electric motor and fixed clutch 620. The rotation of the drive shaft causes the center hub 604 to rotate independent of the pinion gear 610 and outer race. As the hub 604 rotates, it forces the respective cam lobes to contact the lower portion of the roller bearings 612. The roller bearings 612 then impinge against the outer race, thus locking the inner hub 604 and pinion gear 610 together. Continued rotation of the drive shaft will now apply 100% of the motor drive force to the pinion gears 610, due to the locked rolling clutches, and power extend or retract the rearview head. Once electrical power is cut to the drive motor, the cam lobes will disengage from their respective bearings 612 and the pinion gears will return to a "free-wheeling" state.

Figure 7:
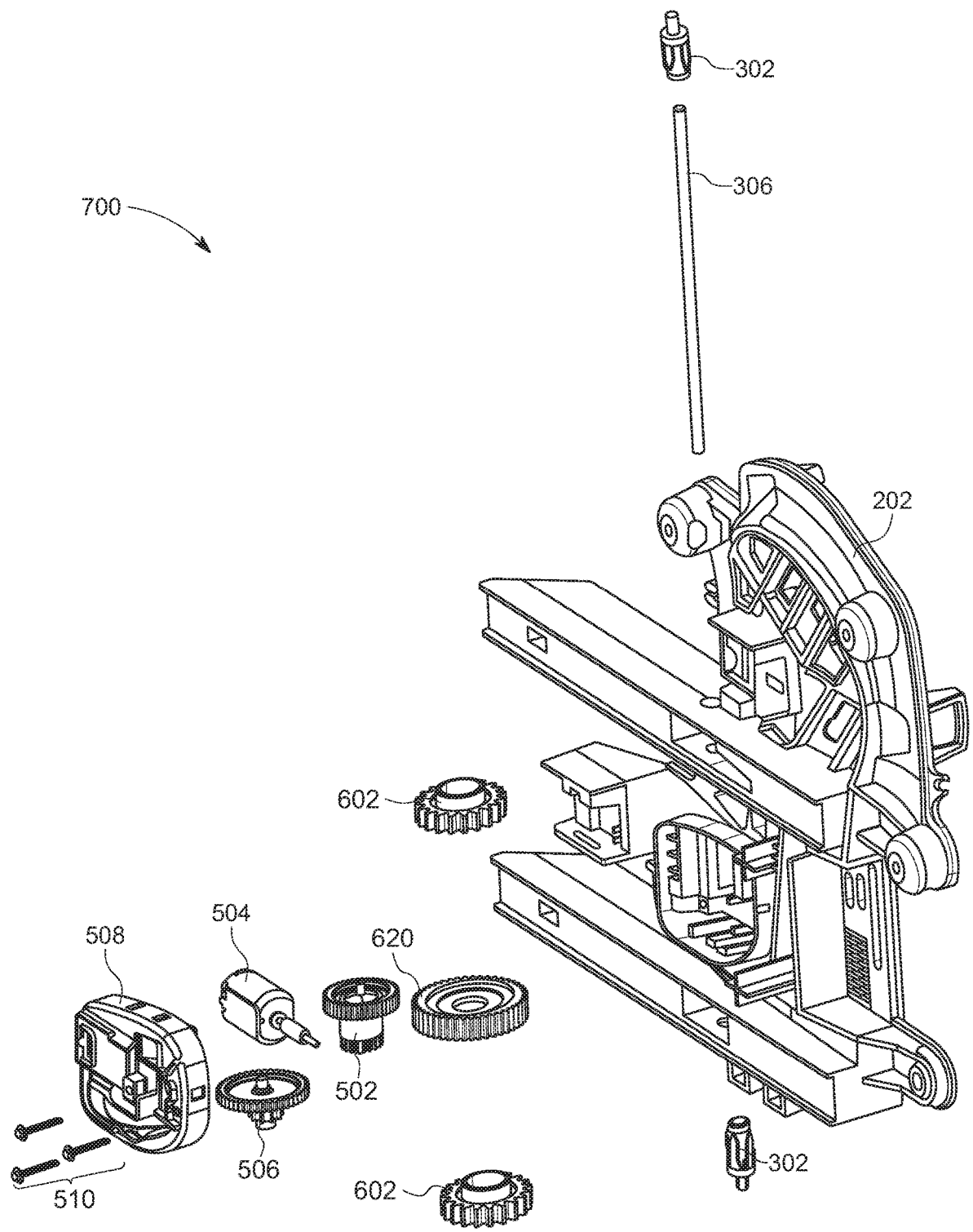
FIG. 7 depicts an exploded view of an embodiment of an improved power telescoping rearview assembly.

An exploded view of an embodiment of the disclosed invention is pictured in FIG. 7. As discussed above, drive shaft 306 is fixed to the inner central hub of the pinion gear assemblies 602. Electric motor 504 rotates the drive shaft 306 during the powered telescoping function to extend and retract the rearview head. During powered rotation, the rolling clutches within the pinion gear assemblies 602 lock, and electrical power is used to drive the pinion gears to telescopically extend/retract the rearview head. When rotation is manual, the rolling clutches allow free rotation of the pinion gears independent of the inner central hub fixed to drive shaft 306. This avoids back-driving the electric motor 504 and contains the total slide force in the rearview arms just like a manual telescoping rearview element.

Figure 8A:
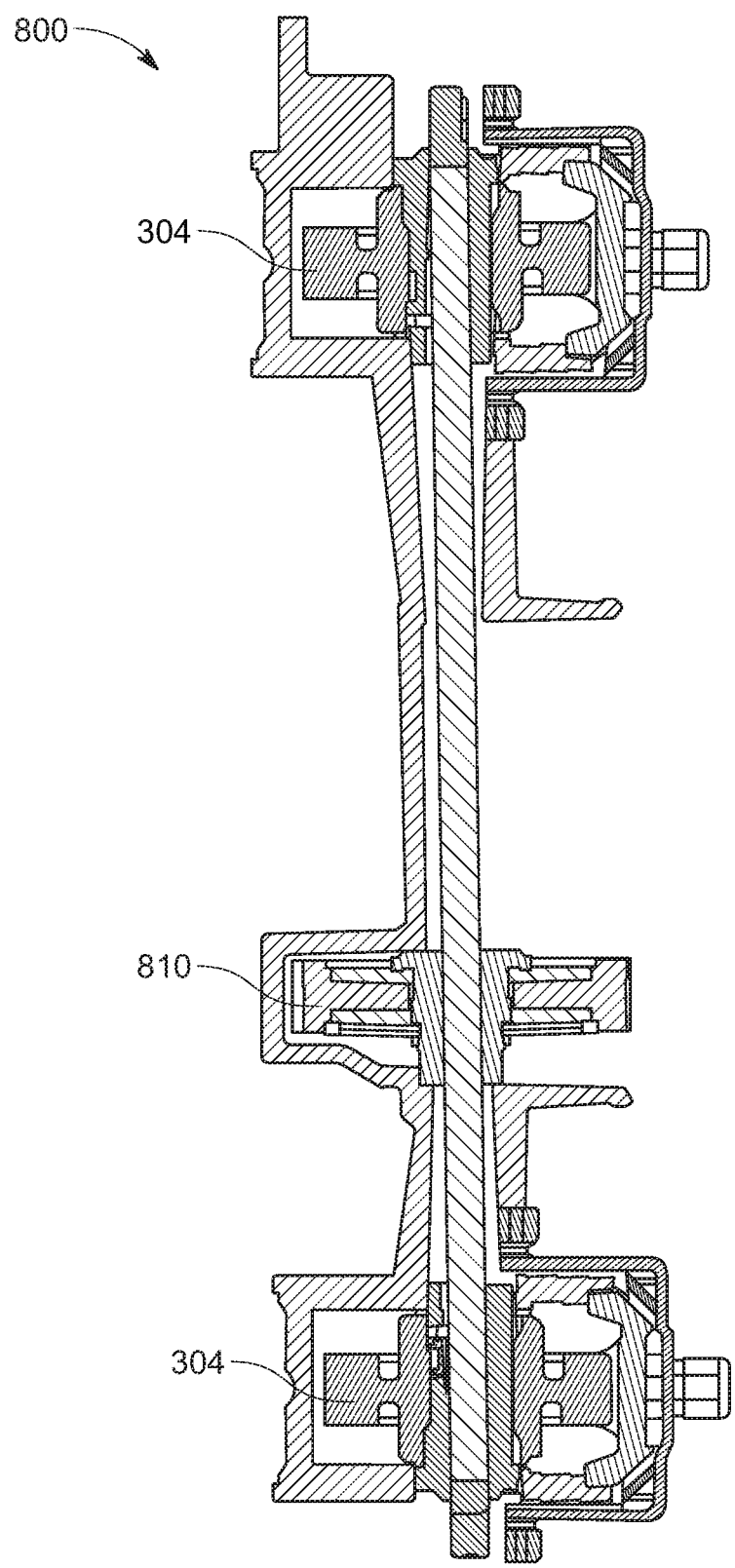
FIG. 8A depicts another embodiment of an improved power telescoping rearview assembly including a drive gear with a locking clutch.

FIG. 8A depicts another embodiment of an improved powered telescoping rearview element that retains the close dimensional arm interfaces of a manual telescoping rearview element while also reducing manual override slide forces. Like the depictions of the first embodiment of the invention, the FIG. 8A embodiment is illustrated along the A-A section of FIG. 2A. In the depicted embodiment of the disclosed invention, the slip clutch common in most existing powered telescoping rearview elements (e.g., slip clutch assembly 310 in FIGS. 3-5) is replaced with a locking clutch assembly 810. In embodiments, the drive shaft of the power drive assembly is rotationally fixed through the central hub of the locking clutch assembly. Traditional pinion gears 304 (without the rolling clutches of the previously described embodiment) are on the outer ends of the drive shaft.

The FIG. 8A embodiment of the improved powered telescoping rearview assembly maintains the full drive force of the powered extend/retract function, yet reduces the manual override slide forces to a level substantially similar to that of a typical manual telescoping rearview element. During powered rotation, the locking clutch assembly 810 rotates with the drive shaft, translating power to the pinion gears 304 to telescopically extend/retract the rearview head. But when the vehicle operator manually extends or retracts the rearview head, inner lever arms of the locking clutch assembly shift to prevent the back-driving of the electric motor.

Figure 8B:
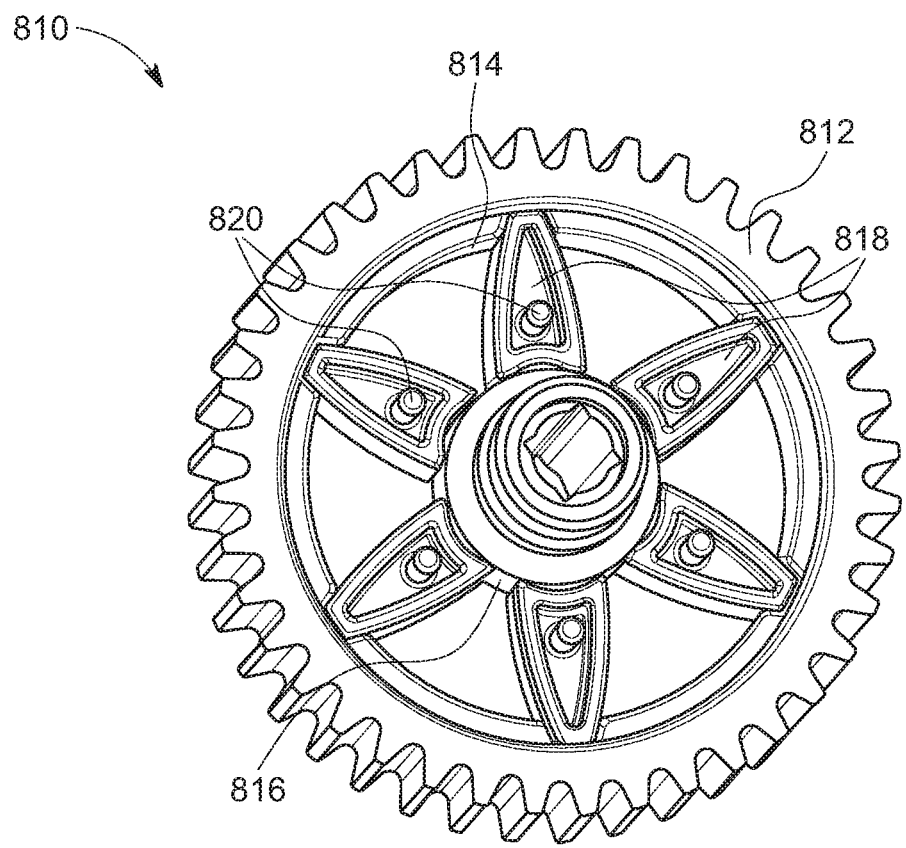
FIG. 8B depicts a front view of the drive gear with a locking clutch.
Figure 8C:
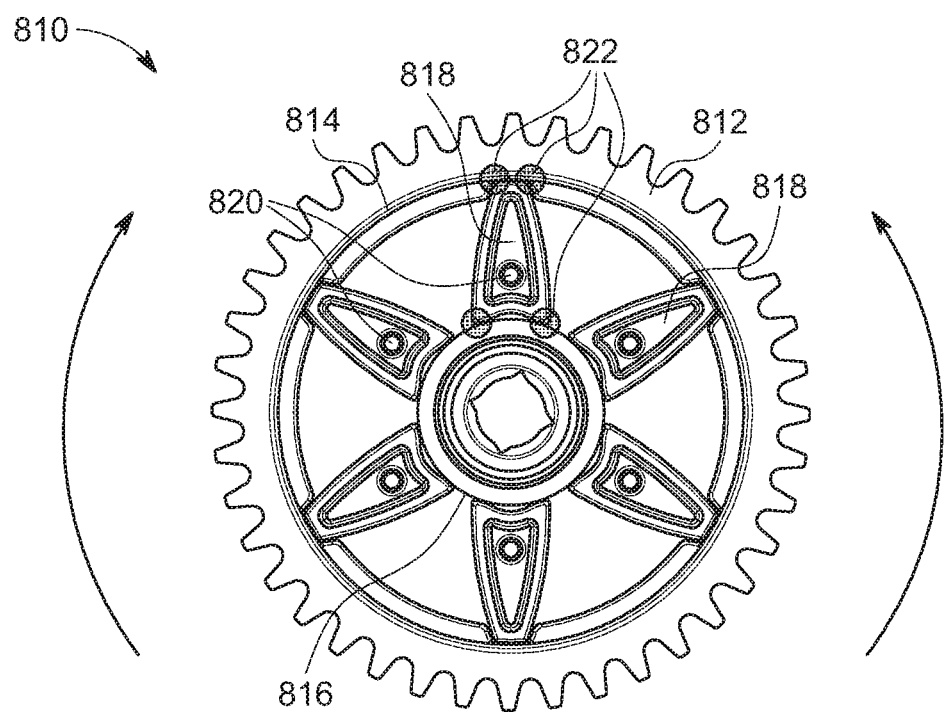
FIG. 8C depicts the drive gear during gear rotation.
Figure 8D:
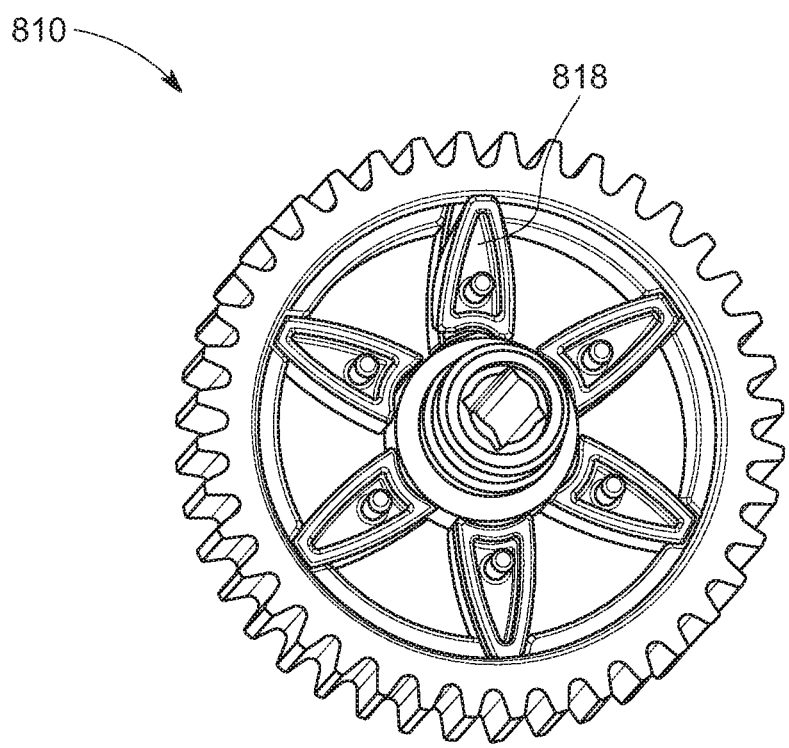
FIG. 8D depicts the drive gear in a locked position.

FIGS. 8B-8D depict the locking clutch assembly 810. Locking clutch assembly 810 includes drive gear 812, outer drive race 814, inner drive race 816, a plurality of lever arms 818, and respective lever arm pivots 820. Locking clutch assembly 810 allows for powered gear rotation in the directions of the pictured arrows. The drive gear will rotate in one direction when the rearview head is being extended away from the vehicle, and the opposite direction when the rearview head is being retracted towards the vehicle.

Activation of the electric motor causes the locking clutch assembly 810 and drive shaft to rotate. The powered rotation of the locking clutch assembly 810 urges the radial lever arms 818 to impinge against both outer drive race 814 and inner drive race 816. Exemplary impingement points 822 are depicted for one lever arm 818. The lever arms 818 rotate about the rotational axis of the drive shaft, while impinging against the inner and outer drive races of the drive gear. Consequently, the rotating locking clutch assembly 810 transfers 100% of the motor drive force to the pinion gears 304 to power extend or retract the rearview head.

Should it be necessary to manually extend or retract the rearview head, embodiments of the locking clutch assembly 810 protect the motor from being back-driven and potentially damaged. Manual extension or retraction of the rearview head forcibly rotates the pinion gears 304 and drive shaft. This rotation causes the central hub of the locking clutch assembly 810 to rotate, pivoting the lever arms 818 with respect to their original positions around lever arm pivots 822. FIG. 8D depicts an exemplary pivoted lever arm 818. Due to the lack of impingement points required for drive gear rotation, the central hub will rotate independently of the drive gear 812, thus minimizing the potential for damage to the motor, the drive shaft, or other parts of the drive system.

Though the disclosed embodiments solve the aforementioned manual override force issues common in existing systems, problems remain regarding the noise produced by the drive motor in powered telescoping rearview elements.

Powered Telescoping Rearview Elements With Improved Power Drive System

As discussed above, existing powered telescoping rearview elements may emit a noise that is loud or distracting to the vehicle operator when in use. This noise can be attributable to three main design restrictions: (1) the worm gear on the drive motor; (2) the oscillation of the armature shaft inside the drive motor; and (3) split trunnions located on the case frame and cap.

First, in order to make the drive system as compact as possible, existing systems contain a plurality of superimposed, matching parallel gears, with each succeeding gear set providing both a decrease in shaft rotational speed and an increase in the final available drive torque. Such gear assemblies can be seen in FIGS. 2A-5. As discussed in detail above, existing systems also employ a slip clutch assembly that allows the power drive to be manually overridden so that the rearview head position can be selective adjusted. Because the slip clutch does not work as intended without the drive train being "locked" in rotation, the first drive gear in the gear assembly (i.e., the drive immediately next to the drive motor) is a worm gear. The worm gear is attached directly to the high turning miniature drive motor and is therefore the fastest turning gear set in the entire system. This results in a high speed whine emanating from the drive motor, which can be distracting to some vehicle operators.

Second, all worm gears tend to oscillate during shaft rotation. The oscillation is caused by the worm gear either pulling or pushing (depending on the direction of motor rotation) the motor armature shaft to the internal limits of its travel and then snapping back, causing the worm screw to resync and reset the gear teeth spacing every motor revolution. Oscillation can usually be controlled by limiting the end travel free-play of the motor shaft through the use of a "thrust" bearing configuration located in close proximity to either end of the motor drive shaft. Unfortunately, miniature motors typically cannot be constrained tight enough to fully eliminate the armature shaft oscillation without impinging on the drive shaft and causing a torque-reducing drag on the drive motor. This results in the worm gear oscillating the drive shaft fore and aft far enough to allow the metal ends of the internal armature to contact the brass axel bushings on the drive motor housing. At slow revolution speeds this contact results in a series of metallic clicks emanating and resounding through the metal drive motor housing. At high speeds, the interval between the individual percussion contacts becomes imperceptible to the human ear, so the noise generated sounds more like a continuous rattle coming from the motor.

Third, noise issues arise from the gear trunnions being split between the cap and the case frame. To keep the packaging size as small as possible, as previously stated, the gear assembly is stacked in a linear, parallel alignment to the final telescoping drive shaft. Although this results in a relatively compact design, it also forces the axel trunnions (i.e., the axel journal bearings that fix the opposing ends of the axel shafts and allow either end of the gear shafts to rotate) to split—half of each trunnion is located in the case frame with the other half located in the cap. This causes issues with both the axial alignment and the concentric constriction on the gear shafts' bearing surfaces. Misalignment and/or over-constraining the bearing surfaces will cause torque-reducing drag and an increase in noise output.

Figure 9A:
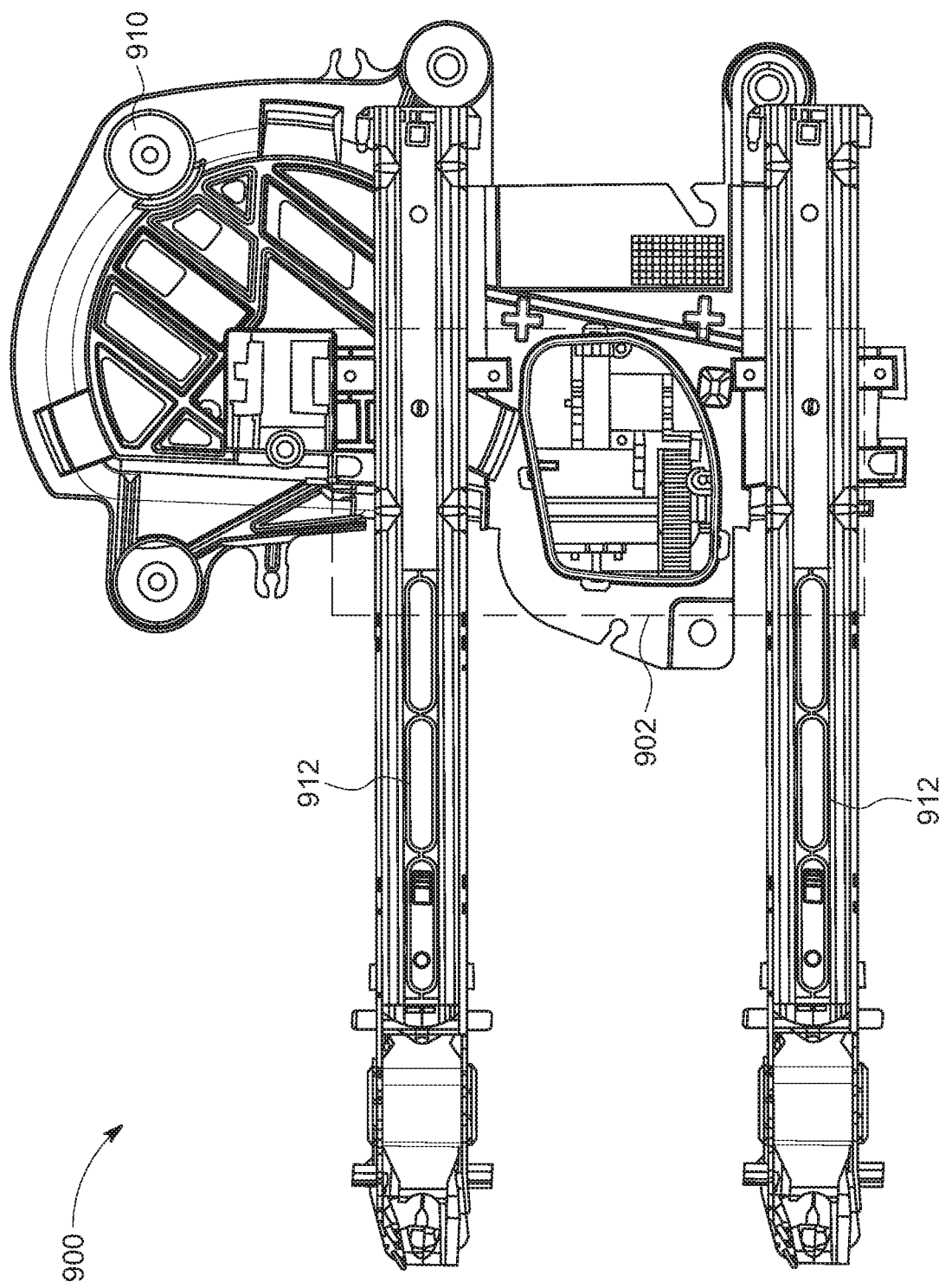
FIG. 9A depicts an embodiment of a powered telescoping rearview assembly including a power drive system.
Figure 9B:
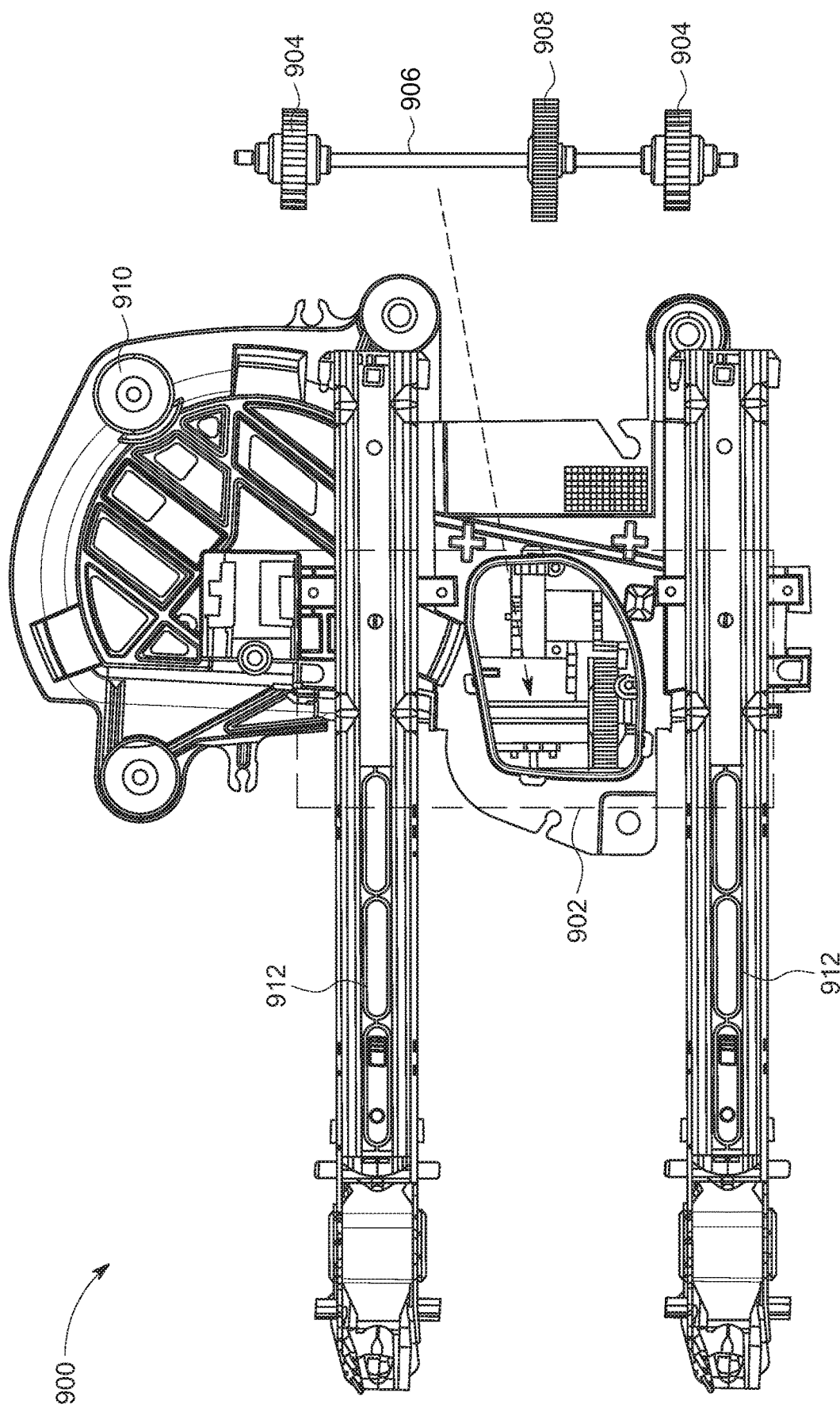
FIG. 9B depicts an embodiment of a powered telescoping rearview assembly with the drive gear assembly removed for viewing.

Therefore, embodiments of the disclosed invention include an improved drive system that is simpler and quieter than existing systems. FIG. 9A depicts an embodiment of a powered telescoping rearview assembly 900 with a power drive system (outlined by box 902). Rearview assembly 900 also includes case frame 910 and arm assemblies 912, which function substantially the same as case frame 202 and arm assemblies 108, respectively. As seen in FIG. 9B, the power drive system outlined by box 902 includes a drive gear assembly including pinion gears 904, drive shaft 906, and slip clutch assembly 908. Drive shaft 906 extends through pinion gears 904 and clutch assembly 908. The drive shaft 906 transmits motor power through the pinion gears 904 provided at opposite ends of the shaft 906. The rotation of the pinion gears 904 drive the arm assemblies 912 inwards and outwards telescopically, moving the rearview head towards and away from the vehicle.

In embodiments, pinion gears 904 include rolling clutches and clutch assembly 908 is a fixed clutch, as seen in the drive gear assembly of FIGS. 6A-7. In other embodiments, clutch assembly 908 is a locking clutch assembly, as seen in the drive gear assembly of FIGS. 8A-8D. Alternatively, clutch assembly 908 is a slip clutch, as described in detail in reference to FIGS. 2-5 above.

Figure 10A:
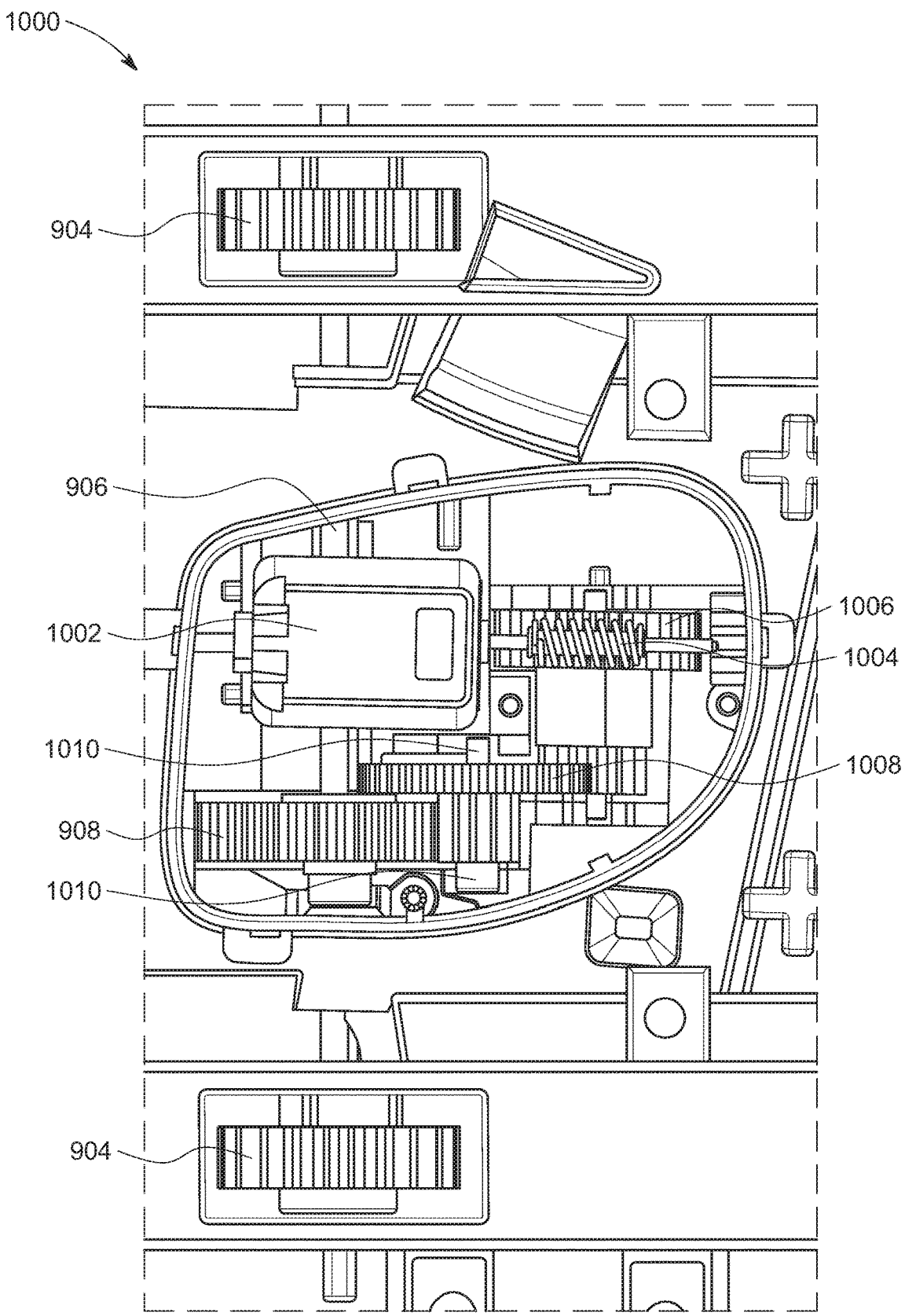
FIG. 10A depicts an embodiment of a power drive system.
Figure 10B:
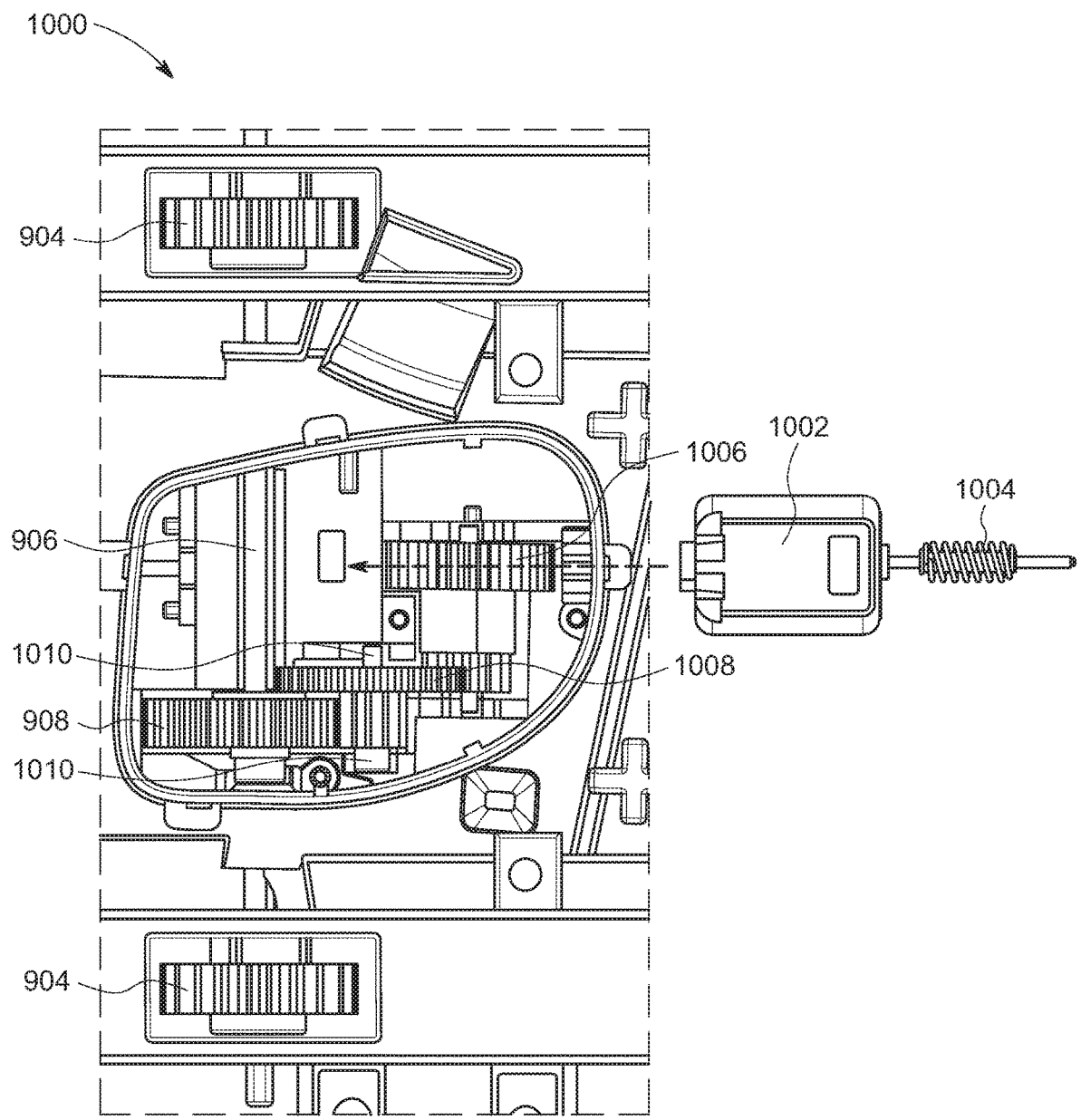
FIG. 10B depicts the embodiment of a power drive system with the motor removed for viewing.

FIG. 10A depicts a closer view of power drive system 1000. The FIG. 10A view is outlined in FIGS. 9A-9B by box 902. Power drive system 1000 includes the drive gear assembly previously described, including pinion gears 904, drive shaft 906, and clutch assembly 908. The drive system 1000 is powered by an electric motor 1002 connected to a worm gear 1004 by an armature. The worm gear 1004 is positioned next to primary drive gear 1006. And the primary gear 1006 is interlocked with secondary drive gear 1008. Because the motor 1002 and worm gear 1004 somewhat obscure the interlocking gear assembly, FIG. 10B depicts the power drive system 1000 with the motor 1002 and worm gear 1004 removed for viewing.

The primary and secondary drive gears include gear axel trunnions located on the top and bottom of their respective gear shafts. Exemplary gear axel trunnions 1010 are labeled with respect to secondary drive gear 1008 for reference. Gear axel trunnions for worm gear 1004 are located on either end of the armature. As discussed above, in order to create compact power drive systems, gear axel trunnions are split down the middle in existing systems. Half of the trunnion resides in the case frame, while the other half is located in the cap that screws into the case frame to cover the power drive system. Exemplary cap 508 is pictured in the exploded views of FIGS. 5 and 7 for reference.

Figure 11A:
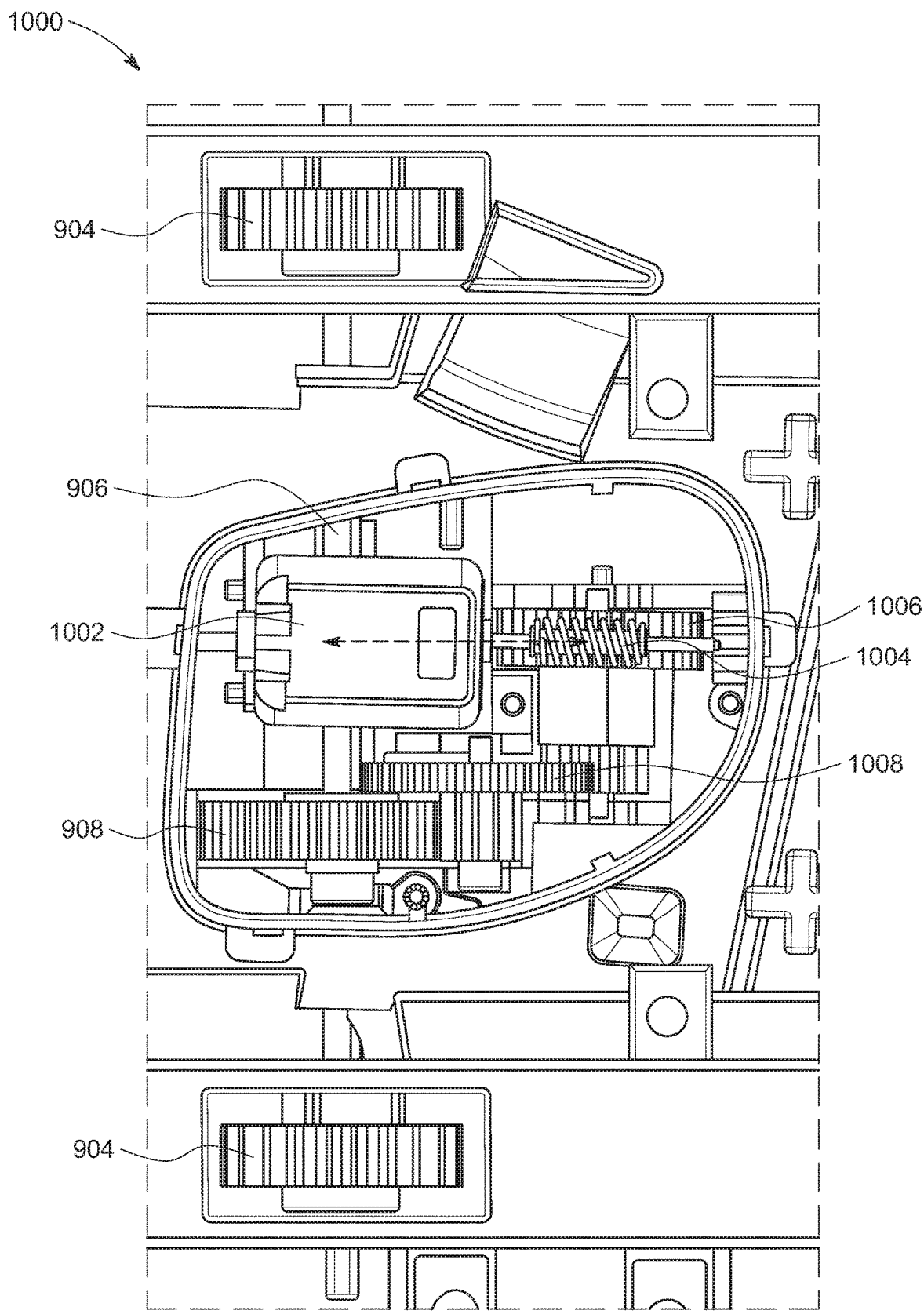
FIGS. 11A and 11B depict the transfer of power throughout an embodiment of a power drive system.
Figure 11B:
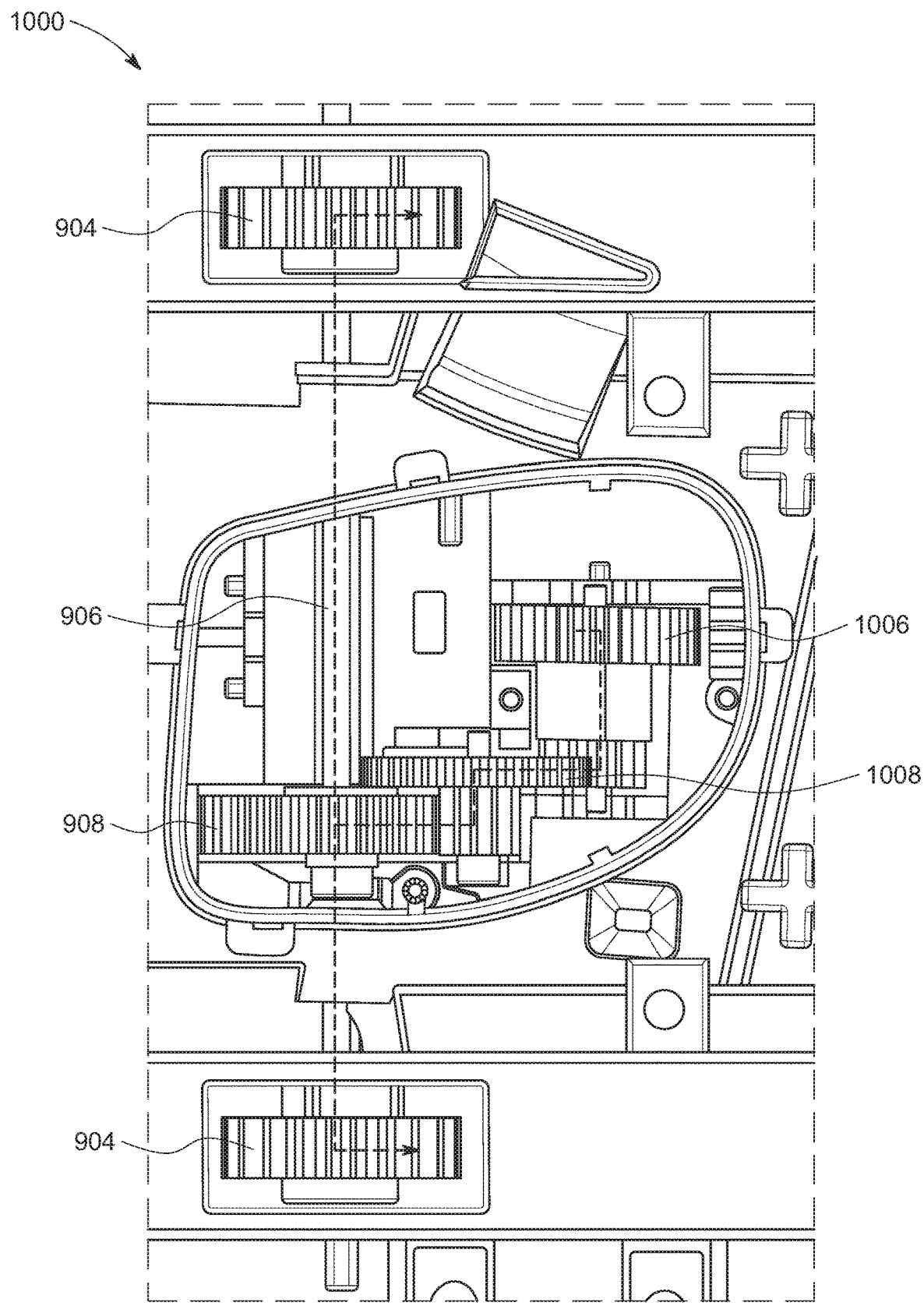

Turning to FIG. 11A, the electric motor 1002 rotates the worm gear 1004 by turning the armature shaft. The rotation of the worm gear 1004 causes the armature to move in and out in the direction pictured by the arrow. This creates the transfer of power depicted by the series of arrows in FIG. 11B. Electric motor 1002 rotates worm gear 1004 which rotates primary drive gear 1006. The rotation of primary drive gear 1006 in turn rotates secondary drive gear 1008, which transfers power to the clutch assembly 908 of the drive gear assembly. The drive gear assembly powers the arm assemblies to telescopically extend or retract in the ways described above with respect to FIGS. 2-8D.

The configuration of worm gear 1004, primary gear 1006, and secondary gear 1008 in FIGS. 10A-11B is that of the previously described existing power drive systems that produce loud, unwanted noise. To solve this problem, the aforementioned gears are substituted with the improved gear assembly of FIG. 12 to create an embodiment of the disclosed invention—an improved drive system that no longer emits the distracting noises.

Figure 12A:
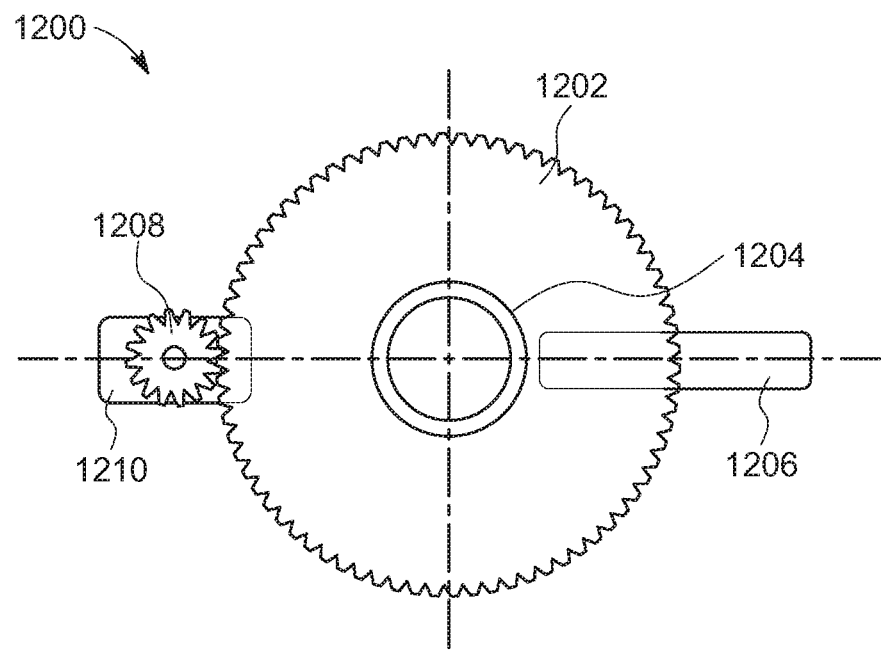
FIG. 12A depicts a top view of an embodiment of an improved gear assembly in a power drive system.

FIG. 12A depicts a top view of improved gear assembly 1200. Improved gear assembly includes a turnstile gear 1202, gear axel trunnion 1204, pinion gear 1208, electric motor 1210, and clutch assembly 1206. Clutch assembly 1206 can be a slip clutch assembly, a fixed clutch, a locking clutch assembly, or another type of clutch. Clutch assembly 1206 is positioned substantially the same as clutch assembly 908—on the drive shaft between the pinion gears that telescopically extend and retract the rearview head.

Figure 12B:
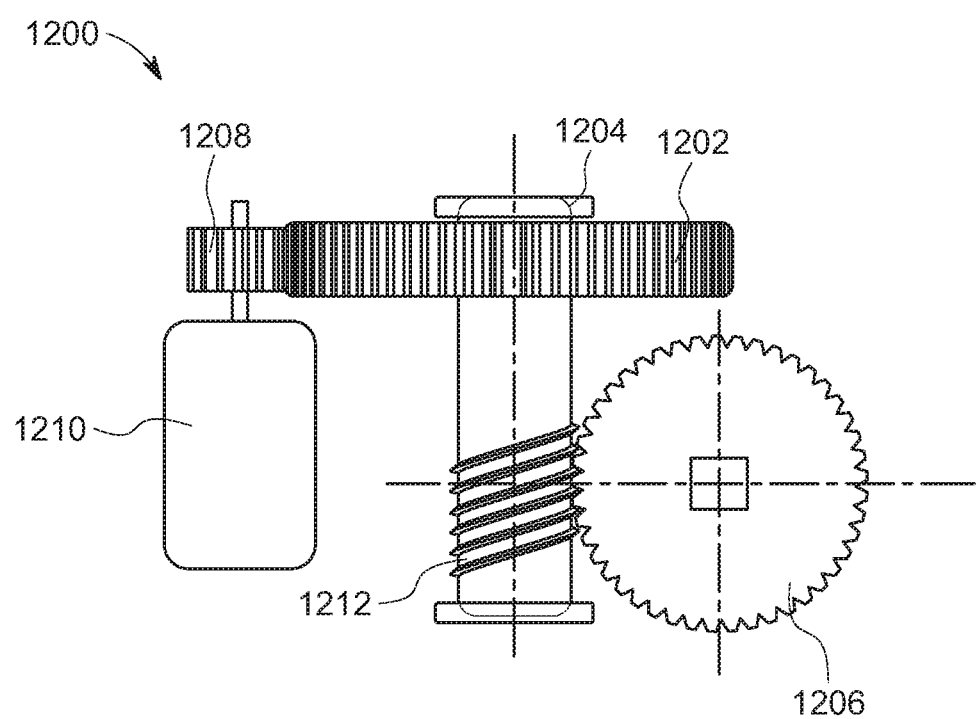
FIG. 12B depicts a side view of an embodiment of an improved gear assembly in a power drive system.

A side view of improved gear assembly 1200 is depicted in FIG. 12B. As shown, motor 1210 is connected to pinion gear 1208 via a motor armature. Pinion gear 1208 interlaces with turnstile gear 1202, which is rotationally attached to a worm gear 1212. The worm gear 1212 interlocks with the clutch assembly 1206 of the drive gear assembly, and also ensures that the system cannot be manually "back-driven." When powered, motor 1210 rotates pinion gear 1208, which rotates turnstile gear 1202. The rotation of turnstile gear 1202 causes worm gear 1212 to rotate, which transfers power to clutch assembly 1206. As discussed, clutch assembly 1206 can be any type of clutch assembly.

In embodiments, clutch assembly 1206 is a fixed clutch connected to pinion gears with rolling clutches via a drive shaft, as in the drive gear assemblies of FIGS. 6A-7. In other embodiments, clutch assembly 1206 is a locking clutch assembly, as seen in the drive gear assembly of FIGS. 8A-8D. Alternatively, clutch assembly 1206 is a slip clutch, as described in detail in reference to FIGS. 2-5 above.

As compared to existing embodiments of the gear configuration (FIGS. 10A-11B), in improved gear assembly 1200, the drive motor 1210 is rotated 90° from its original position to create a smaller packaging space. This allows for the use of the simple pinion gear 1208 as opposed to the worm gear 1004 of existing systems. The pinion drive system is both simpler to manufacture and removes one complete gear set from the assembly. Additionally, it limits the amount of noise created because the motor 1210 can be one of the slower-turning variety. Therefore, the noise inherent in the existing high speed worm drives is eliminated.

Since the drive motor 1210 of the improved system uses a pinion gear 1208 (instead of worm gear 1004) to rotate the primary turnstile gear 1202, there is no corresponding armature oscillation of the kind described above. No armature oscillation means that no rattle or similar motor noise will be generated in the drive motor, again ensuring a quieter system. Further, due to the configuration of the turnstile gear 1202 in the improved system, the axel trunnions will not have to be split between the case frame and the cap—one of the other issues leading to increased noise in the existing systems. In the disclosed invention, the axel trunnions are molded in one piece because each end of the gear axel will be contained solely in either the case frame or top cap. This will reduce the potential for torque-stealing drag and noise inherent in existing drive systems described above.

Throughout the application, reference is made to rearview assemblies and rearview elements. A rearview element may include a mirror for providing a rearview image of surroundings or may include a display unit or any other screen or electronic unit capable of displaying an image of the surroundings. For example, the rearview assembly may include, in addition to mirror assemblies, any camera or sensor assembly which uses a camera or sensor to detect and ultimately display an image of the surroundings.

It should be understood that as used in the description herein and throughout the claims that follow, the meaning of "a," "an," and "the" includes the plural reference unless the context clearly dictates otherwise. Also, as used in the description herein and throughout the claims that follow, the meaning of "in" includes "on" unless that context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate a situation where only the disjunctive meaning may apply.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

What is claimed is:

1. A power telescoping vehicle rearview assembly comprising:
    a bracket mountable to a vehicle;

a rearview head telescopically mounted to the bracket via a plurality of arm assemblies;
a rearview element mounted to the rearview head;
an electric motor mounted to the rearview head; and
a gear assembly connected between the motor and the plurality of arm assemblies, wherein the gear assembly comprises:
pinion gears coupled to the plurality of arm assemblies,
a locking clutch assembly for transferring power from the motor to the pinion gears, wherein the locking clutch assembly selectively disengages the motor from the arm assemblies, and
a drive shaft connecting the locking clutch assembly to the pinion gears,
wherein the locking clutch assembly further comprises:
a drive gear;
an inner central hub rotationally fixed to the drive shaft; and
a plurality of lever arms, each comprising a respective lever arm pivot, located radially around the central hub.

2. The power telescoping vehicle rearview assembly of claim 1, wherein the rotation of the gear assembly causes the plurality of arm assemblies to telescopically move the rearview head between a retracted and an extended position.

3. The power telescoping vehicle rearview assembly of claim 1, wherein the gear assembly allows for the rearview head to be positioned manually.

4. The power telescoping vehicle rearview assembly of claim 1, wherein during powered positioning of the rearview head, the plurality of lever arms impinge the drive gear;
wherein the impingement rotates the locking clutch assembly, and
wherein the rotation of the locking clutch assembly transfers power from the motor to the pinion gears via the drive shaft to telescopically move the rearview head.

5. The power telescoping vehicle rearview assembly of claim 1, wherein manual positioning of the rearview head rotates the pinion gears,
wherein the rotation of the pinion gears rotates the drive shaft,
wherein the rotation of the drive shaft rotates the inner central hub of the locking clutch assembly,
wherein the rotation of the inner central hub shifts the plurality of lever arms around the respective lever arm pivots, and
wherein the shift of the lever arms allows the central hub to rotate independently from the drive gear.

6. The power telescoping vehicle rearview assembly of claim 1, wherein the locking clutch assembly eliminates back-driving of the electric motor in response to the rearview head being positioned manually.

7. The power telescoping vehicle rearview assembly of claim 1, wherein a slide force required to manually position the rearview head is substantially equal to a slide force required to position a rearview head on a manual telescoping vehicle rearview assembly.

8. A power drive system for telescopically moving an external vehicle rearview, comprising:
an electric motor;
a pinion gear connected to an armature extending from the electric motor;
a turnstile gear interlocked with the pinion gear;
a worm gear rotationally attached to the turnstile gear; and
a drive gear assembly connected to the worm gear, wherein the rotation of the drive gear assembly causes the external vehicle rearview element to move between a retracted and an extended position,
wherein the drive gear assembly comprises:
secondary pinion gears coupled to the plurality of arm assemblies;
a locking clutch assembly for transferring power from the motor to the secondary pinion gears, wherein the locking clutch assembly selectively disengages the motor from the arm assemblies; and
a drive shaft connecting the locking clutch assembly to the secondary pinion gears.

9. The power drive system of claim 8, wherein the drive gear assembly comprises:
a drive shaft;
pinion gear assemblies coupled to the arm assemblies, wherein each pinion gear assembly comprises:
an outer pinion gear;
a center hub rotationally fixed to the drive shaft; and
a rolling clutch for selectively disengaging the motor from the arm assemblies, wherein the rolling clutch comprises a plurality of roller bearings between the outer pinion gear and the center hub, wherein the plurality of roller bearings are located radially around the center hub; and
a fixed clutch assembly for transferring power from the motor to the pinion gear assemblies,
wherein the drive shaft connects the fixed clutch assembly to the pinion gear assemblies.

10. The power drive system of claim 9, wherein the plurality of roller bearings allow the outer pinion gear to rotate independently from the center hub in response to the rearview head being positioned manually.

11. The power drive system of claim 8, wherein the locking clutch assembly further comprises:
an outer drive gear;
an inner central hub rotationally fixed to the drive shaft; and
a plurality of lever arms, each comprising a respective lever arm pivot, located radially around the central hub.

12. The power drive system of claim 11, wherein during powered positioning of the rearview head, the plurality of lever arms impinge the outer drive gear,
wherein the impingement rotates the locking clutch assembly, and
wherein the rotation of the locking clutch assembly transfers power from the motor to the secondary pinion gears via the drive shaft to telescopically move the rearview head.

13. The power drive system of claim 11, wherein manual positioning of the rearview head rotates the secondary pinion gears,
wherein the rotation of the secondary pinion gears rotates the drive shaft,
wherein the rotation of the drive shaft rotates the inner central hub of the locking clutch assembly,
wherein the rotation of the inner central hub shifts the plurality of lever arms around the respective lever arm pivots, and
wherein the shift of the lever arms allows the central hub to rotate independently from the outer drive gear.

* * * * *